April 27, 1937.  E. J. O'NEILL  2,078,867
DETECTION DEVICE FOR SPROCKET HOLES OF MOTION PICTURE FILMS
Filed Sept. 30, 1935   2 Sheets-Sheet 2
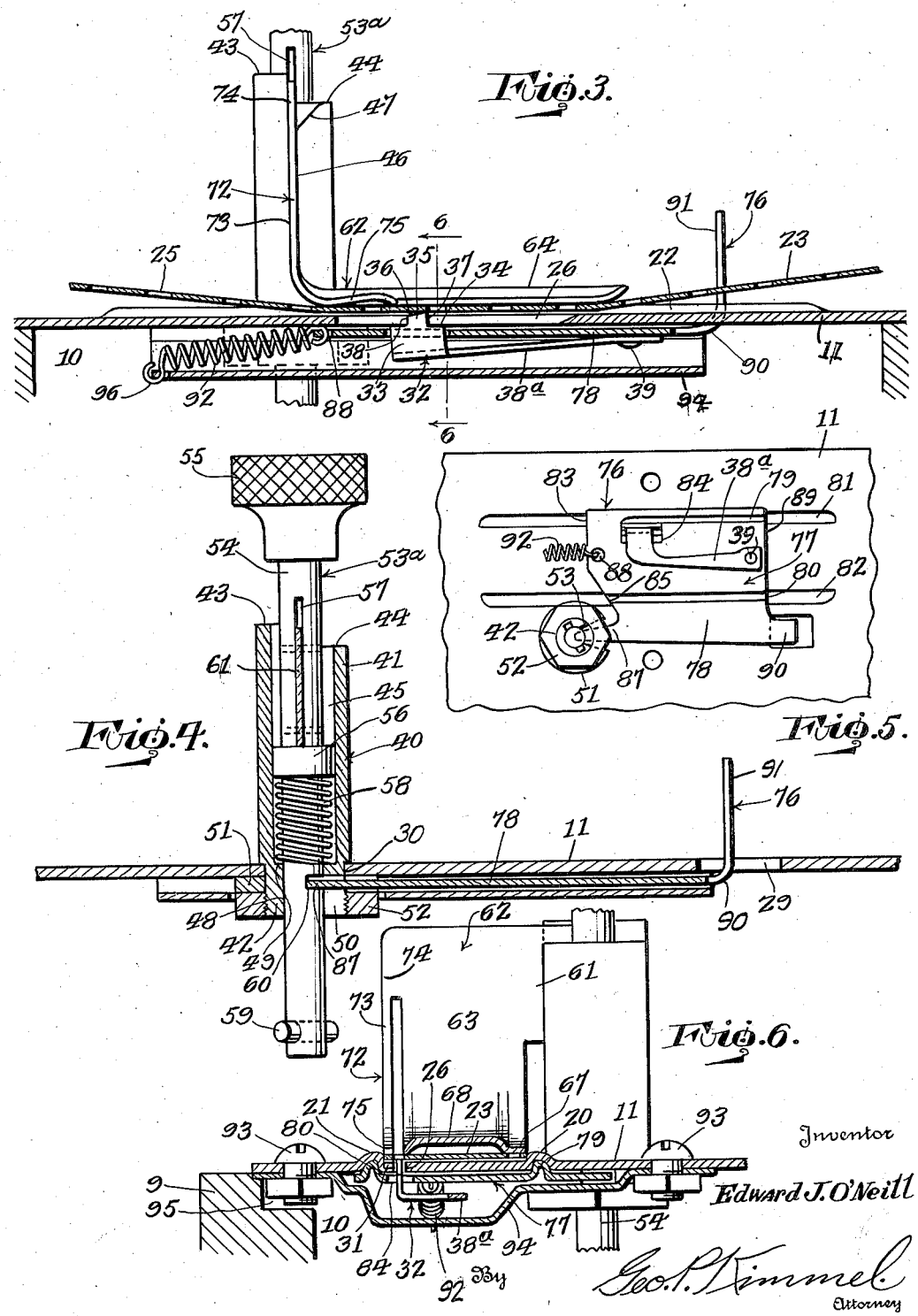
Inventor
Edward J. O'Neill
By Geo. P. Kimmel
Attorney Patented Apr. 27, 1937

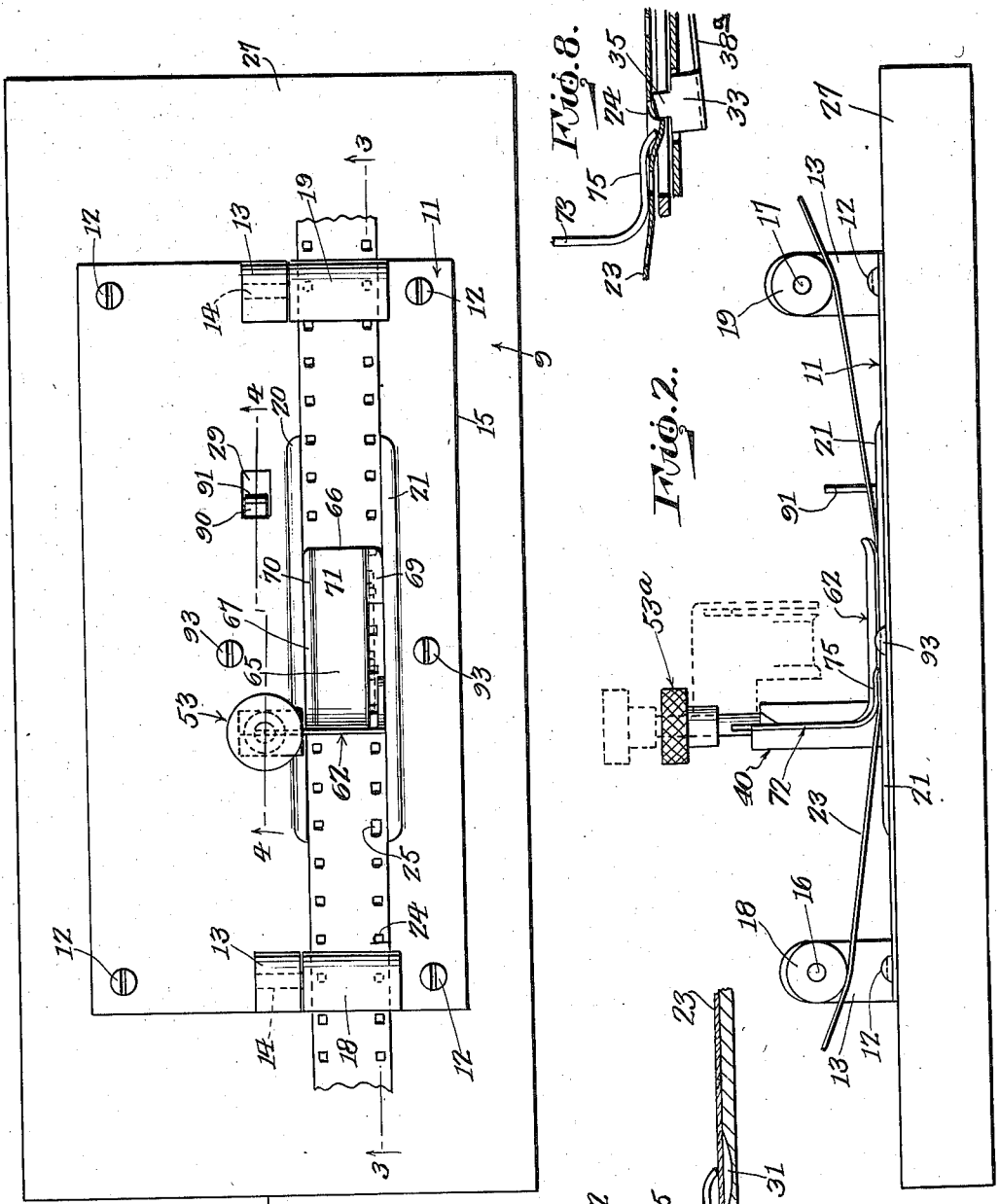

2,078,867

UNITED STATES PATENT OFFICE 2,078,867

DETECTION DEVICE FOR SPROCKET HOLES OF MOTION PICTURE FILMS

Edward J. O'Neill, Syracuse, N. Y., assignor to Alvin C. Loewer, Baltimore, Md.

Application September 30, 1935, Serial No. 42,942

16 Claims. (Cl. 73—51)

This invention relates to a detection device for use in connection with motion picture films and has for its object to provide, in a manner as hereinafter set forth, a device of the class referred to for automatically detecting, as well as materially expediting the location of split sprocket-holes, as well as torn or worn sprocket-holes which have the length or width thereof increased to an extent to cause the film to feed improperly through a projector.

A further object of the invention is to provide, in a manner as hereinafter set forth, a device of the class referred to for indicating split, worn or torn sprocket-holes in a motion picture film.

A further object of the invention is to provide, in a manner as hereinafter set forth, a device of the class referred to for automatically, expeditiously and accurately detecting and indicating split, torn or worn sprocket-holes in motion picture films thereby overcoming the slow, inaccurate and inconvenient sight and touch method now generally employed for such purpose.

A further object of the invention is to provide, in a manner as hereinafter set forth, a device for the purpose referred to including a pressure foot to provide for the detection and the subsequent indication of a split sprocket-hole in a motion picture film.

A further object of the invention is to provide, in a detection device for the purpose referred to, means to cause one of the edges of the split of a non-worn split sprocket-hole in a motion picture film to coact with a detector element to detect and subsequently locate such hole on the film.

Further objects of the invention are to provide, in a manner as hereinafter set forth, a device for the purpose referred to which is simple in its construction and arrangement, strong, durable, compact, automatic in its action, thoroughly efficient for the purpose intended thereby, readily assembled, conveniently arranged in position for detecting and indicating a split, worn or torn sprocket-hole and inexpensive to manufacture.

With the foregoing and other objects which may hereinafter appear, the invention consists of the novel construction, combination and arrangement of parts as will be more specifically referred to and as are illustrated in the accompanying drawings wherein is shown an embodiment of the invention, but it is to be understood that changes, variations and modifications may be resorted to which fall within the scope of the invention as claimed.

In the drawings:

Figure 1 is a top plan view of the device installed with respect to a motion picture film for detecting a split, torn or worn sprocket-hole.

Figure 2 is a front elevation of the structure shown in Figure 1,

Figure 3 is a section on line 3—3, Figure 1, upon an enlarged scale,

Figure 4 is a section on line 4—4, Figure 1, upon an enlarged scale,

Figure 5 is a fragmentary view in inverted plan of the device,

Figure 6 is a section on line 6—6, Figure 3,

Figure 7 is a fragmentary view of the device illustrating the pressure foot in front elevation and in inactive position, and Figure 8 is a fragmentary view of the device illustrating in front elevation the pressure foot in active position disposing an edge of a split of a split sprocket-hole to engage the edge of the detector element for the purpose of shifting the latter to detect and to provide for the subsequent indicating of the location of the split sprocket-hole in the film.

Preferably, the device is adapted to be anchored upon a support 9 provided intermediate its ends with a rectangular opening 10. The device includes a rectangular base plate 11 which extends across and is of greater length and width than that of opening 10. The plate is positioned upon the upper face of and anchored to the support 9 by the holdfast devices 12 which extend through plate 11 and engage in support 9. The plate 11 is spaced from the sides and ends of support 9.

On the longitudinal median of and integral with plate 11 is a pair of spaced parallel upstanding apertured lugs 13 having their outer side edges flush with the end edges of plate 11. The apertures in lugs 13 are designated 14 and they are arranged between the horizontal medians and upper ends of the lugs. Fixed in the apertures 14 and extending towards the front edge 15 of plate 11 are shafts 16, 17 upon which are revolubly mounted film guide rollers 18, 19 respectively arranged over and spaced from the upper face of plate 11. The latter, between its longitudinal median and its edge 15, has spaced portions thereof to form a pair of spaced parallel ribs 20, 21 provided by upwardly extended parts of said plate 11. The ribs 20, 21 coact with the body of plate 11 to provide a guide passage 22 for the film 23. The passage 22 is disposed lengthwise of the upper face, intersected centrally by the transverse median and terminates adjacent to the end edges of plate 11. Split and worn or torn sprocket-holes in one of the rows of sprocket-holes in the film are indicated at 24, 25 respectively.

The plate 11, in close proximity to the rear side of rib 21, is formed with an elongated narrow slot 26 of less length than said rib and intersected by the transverse median of plate 11. That portion of said slot which extends from one side of the transverse median of groove 22 towards the end edge 27 of the plate 11 is of greater length than that portion of the slot extending from the other side of the transverse median of groove 22 towards the end edge 28 of the plate 11. The latter is formed adjacent the rear side of and in proximity to the forward end of rib 20 with a rectangular opening 29. The plate 11 is provided adjacent the rear side of and between the transverse median and the rear end of rib 20 with a circular opening 30. The upper face of the bottom wall of the groove 22, between the rear end portion of slot 26 and the rear face of rib 21, is formed with a concavity 31.

The device includes a normally combined film interengaging and spring controlled detector element 32 consisting of an inclined head 33 provided centrally of its top edge 34 with an upstanding detector lug 35 having its upper edge 36 inclining downwardly from its side edge 37 to its side edge 38. The length and thickness of lug 35 is less than the length and width respectively of a normal sprocket-hole. The head 33 is carried on the rear leg of an angle-shaped resilient arm 38ª having its forward leg anchored, as at 39, (Figure 5) to the lower face of a spring controlled slidable latching mechanism arranged within the opening 10 and below plate 11. The latching mechanism will be hereinafter more fully referred to. The arm 38ª inclines downwardly from its forward or anchored end. The function of the detector element 32 is for the lug 35 to enter a torn or worn sprocket-hole to detect the latter and to provide for subsequently indicating the location of such hole in the film. Such functions and how they are accomplished will be hereinafter referred to. The element 32 operates through the slot 26 and resiliently bears against the film until it enters a torn or worn sprocket-hole.

Extending through the opening 30 of plate 11 and into opening 10 of support 9 is a standard 40 having an enlarged upper and a reduced lower portion 41, 42 respectively of rectangular and circular contour respectively in sectional plan. The portion 41, at its top, has a high top edge part 43 and a low top edge part 44 whereby one side and a half of the front and back of the standard, at its upper end, extends above the other side and the other half of the front and back thereby providing a clearance for a purpose to be referred to. The upper portion 41 of standard 40 is formed with a circular socket 45 opening at the upper end thereof, and centrally of the front of portion 41 the standard is formed with a vertically disposed slot 46 open at its upper end and communicating throughout its length with socket 45. One of the walls of slot 46, at its upper portion, is inclined, as at 47, in a direction towards and terminates in the low top edge part 44. The standard 40 is provided with a vertical opening 48 which extends from the base 49 of socket 45 to the lower end of the reduced portion 42. The latter is provided with a vertically disposed V-shaped cutout 50 in one side thereof. The portion 42 is peripherally threaded and is surrounded by a washer 51 which abuts the lower face of plate 11. Threadedly engaging with the portion 42 and abutting washer 51 is a clamping nut 52. The washer 51 is formed with a cutout 53 which forms a continuation of the cutout 50. When the standard 40 is positioned relative to plate 11 the lower end of the portion 41 seats on plate 11 and the portion 42 extends through opening 31. The nut 52 coacts with washer 51 and the lower end of portion 41 for clamping the standard in an upright position to plate 11 at a point intermediate the ends of rib 20.

The device includes a horizontally revoluble, vertically movable, spring controlled combined split, worn or torn sprocket-hole indicating, film holding down, film concealing and presser foot structure 53ª comprising a vertically disposed latchable shaft 54 which extends through the standard 40. The shaft, at its upper end, is provided with an enlarged head 55 constituting a finger and thumb piece to facilitate the rotating of the shaft when occasion requires. The shaft, intermediate its ends, is formed with an annular flange 56 and a lengthwise peripheral socket 57, and the latter extends from the upper face of flange 57 and terminates at a point adjacent the lower face of head 55. Surrounding shaft 54 and interposed between the lower face of flange 56 and the base 49 of socket 45 is coiled controlling spring 58 for the shaft. The shaft, in proximity to its lower end, is provided with a diametrically disposed stop pin 59 which coacts with the nut 52 for arresting the upward movement of the shaft when the latter is released. The shaft 54, between flange 56 and stop pin 59, is formed with a horizontally disposed diametrically extending groove 60 which is open at each end. The groove 60 is adapted to register with the cutout 50 in the lower portion 42 of the standard 40. Extending into the socket 57, as well as being anchored to the shaft 54, is the coupling arm 61 of an upstanding angle-shaped film holding down member 62 formed of a vertical leg 63 terminating at its lower end into a horizontal leg 64 of greater length than leg 63. The latter, at the upper end terminal portion of its outer side edge is formed with a lateral extension 74 providing a suspension for a presser-foot to be referred to. The leg 64 is disposed at right angles to leg 63 and is formed of a narrow stretch 65 merging at its outer end into a wide stretch 66 (Figure 1). The stretch 65 merges into the bottom of and is of the same width as the leg 63. The coupling arm 61 merges at its outer end in the upper part of the inner side of and is of a width less than the height of arm 63. The latter is flat. The narrow stretch 65 of leg 64 has a flat inner side portion 67 (Figure 6). The remaining portion 68 is of arch-shaped contour (Figure 6) and extends above the side portion 67. The stretch 66 has a pair of flat side portions 69, 70 (Figure 1) and an intermediate portion 71 of arch-shaped contour extended above the portions 69, 70. The portions 67, 68 of stretch 65 merge into the portions 70, 71 respectively of the stretch 66. The portion 69 is disposed laterally with respect to the stretch 65. Carried by the member 62 is an angle-shaped resilient presser foot 72 formed of a vertical leg 73 (Figure 6) and a foot part 75. The leg 73 merges into the outer portion of the bottom edge of extension 74 whereby the latter suspends and acts to hold the presser foot 72 in spaced aligning relation with respect to the outer side edges of the legs 63, 64 of member 62. The arm 73 is of greater length than that of the foot part 75. The latter merges into and extends at right angles from the lower end of arm 73 in a direction towards the side portion 69 of the stretch 66 of leg 64. The foot part 75 opposes the outer side edge of the stretch 65 and has its free end spaced from the inner edge of side portion 69 of stretch 66. The foot part 75 is of compound curvature and has its free end downwardly disposed.

Associated with the detector element 32 and the structure 53a is a spring controlled latching mechanism 76 functioning to maintain element 32 in its normal position and for latching structure 53a in non-indicating position. The mechanism 76 has its major portion arranged below plate 11 and its remaining portion extending upwardly through opening 29. The mechanism 76 includes a slide member 77 (best shown in Figure 5) consisting of a plate 78 formed with a pair of spaced parallel ribs 79, 80 which travel in guide grooves 81, 82 in the plate 11 and the said grooves are formed by the upstanding portions of plate 11 which provide the ribs 20, 21 (Figure 6). The plate 78 is provided, adjacent its end 83, with an opening 84 through which extends the head 33 of the detector element 32. The end 83 of plate 78 is cut out, as at 85, to form a nose 87 at one corner thereof. The end 83 of plate 78 has an opening 88. The other end of plate 78, indicated at 89, has that corner thereof opposite the corner provided with the nose 87 formed with an extension 90 which terminates in a vertically disposed arm 91. The arm 91 extends through the opening 29 in plate 11 and is manually shiftable in a direction away from the presser-foot 72 for releasing the mechanism 76 from the structure 53a whereby the latter will be automatically elevated. Anchored at one end in the opening 58 (Figure 5) is the controlling spring 92 of said mechanism 76. Secured to and offset with respect to the lower face of plate 11 by the holdfast devices 93 is a housing member 94 for that portion of the mechanism 76 arranged below plate 11. The support 9 is cut out, as at 95, to provide a clearance for one of the holdfast devices 93. The other end of spring 92 (Figure 3) is anchored to one end of the housing member 94, as at 96.

When the mechanism 76 is in latching engagement with the structure 53a, the nose 87 extends through the cutouts 53, 50 into groove 60 of bolt 54 (Figure 4) and is held in such position by the action of spring 92.

The leg 64 of member 62 acts to hold the film 23 down upon plate 11 as the film travels through groove 23, in a manner to prevent a spliced portion of the film from engaging the inner edge of the side portion 69 of stretch 64, or in other words, the stretch 64 snugly engages with the film in a manner so as not to arrest the movement of the film while the later is traveling through the groove 22. The foot part 75 of the presser foot 72 bears against the film in a manner so as not to retard the travel thereof.

It will be assumed that the device is in the position shown in Figures 3, 4 and 5 and the film is arranged to travel between member 62 and plate 11. As the film travels through groove 22 the device will be as shown until a torn or worn sprocket-hole arrives over the detector lug 35, at which time the lug will enter such hole, and as the film continues to travel the detector element 32 and mechanism 76 will be carried therewith against the action of spring 92 whereby the nose 87 will be withdrawn from groove 60 and the structure 53a released. On the releasing of structure 53a the member 62 will be elevated from the film by the action of the spring 58 thereby indicating that the film has a worn or torn sprocket-hole. The travel of the film is discontinued at this point and the shaft 54 is revolved in a direction to remove member 62 from off the film. The latter is then removed from interengagement with the detector lug 35.

Now it will be assumed that the film has a split sprocket-hole, such as indicated at 24. As the film travels through groove 22 and the split arrives over concavity 31 the foot part 75 of presser foot 72 will depress the film in the manner as shown in Figure 8 to provide for an edge of the split to be positioned against edge 38 of the detector lug 35 whereby, as the film continues to travel, it will carry the detector element 32 and the mechanism 76 therewith to an extent to provide for the releasing of structure 53a to provide for indicating that the film has a split sprocket-hole.

What I claim is:

1. In a detection device for the purpose set forth, a normally non-slidable resilient detector element arranged to be depressed by the travel thereover of a film provided with a row of non-split sprocket receiving holes normally of uniform size, a releasable normally depressed, latched, horizontally revoluble, automatically upwardly movable combined film holding down, film concealing and split and abnormally enlarged sprocket-hole indicating structure, a normally active and stationary slidable latching mechanism interengaging with said structure for maintaining the latter depressed, said element being secured to said mechanism and adapted to enter an abnormally enlarged sprocket-hole whereby said element will be slid from its normal position by the film carrying said mechanism therewith to an extent to release said structure to permit of the automatic elevating thereof from its depressed position and thus indicate the detection of an enlarged hole.

2. In a detection device for the purpose set forth, a normally non-slidable resilient detector element arranged to be depressed by the travel thereover of a film provided with a row of non-split sprocket receiving holes normally of uniform size, a releasable normally depressed, latched, horizontally revoluble, automatically upwardly movable combined film holding down, film concealing and split and abnormally enlarged sprocket hole indicating structure, a normally active and stationary slidable latching mechanism interengaging with said structure for maintaining the latter depressed, means providing a guide groove for the film having its bottom formed with a longitudinal slot and a cavity adjacent the outer wall of the slot, said structure including a presser foot for depressing a portion of the film following the leading edge of the split of a split sprocket-hole into the cavity, said element being secured to said mechanism and extended into said slot and in the path of the depressed portion of the film whereby said element will be slid from its normal position by the film carrying said mechanism therewith to an extent to release said structure to permit of the automatic elevating thereof from its depressed position and thus indicate the detection of a split sprocket-hole.

3. In a detection device for the purpose set forth, a normally non-slidable resilient detector element arranged to be depressed by the travel thereover of a film provided with a row of non-split sprocket receiving holes normally of uniform size, a releasable normally depressed, latched, horizontally revoluble, automatically upwardly movable combined film holding down, film concealing and split and abnormally enlarged sprocket-hole indicating structure, a normally active and stationary slidable latching mechanism interengaging with said structure for maintaining the latter depressed, said element being secured to said mechanism and adapted to enter an abnormally enlarged sprocket-hole whereby said element will be slid from its normal position by the film carrying said mechanism therewith to an extent to release said structure to permit of the automatic elevating thereof from its depressed position and thus indicate the detection of an enlarged hole, said structure including a presser foot for depressing a portion of the film following the leading edge of the split of a split sprocket-hole, said element being disposed in the path of the depressed portion of the film whereby said element will be slid from its normal position by the film carrying said mechanism therewith to an extent to release said structure to permit of the automatic elevating thereof from its depressed position and thus indicate the detection of a split sprocket-hole.

4. In a detection device for the purpose set forth, a normally non-slidable resilient detector element arranged to be depressed by the travel thereover of a film provided with a row of non-split sprocket receiving holes normally of uniform size, a releasable normally depressed, latched, horizontally revoluble, automatically upwardly movable combined film holding down, film concealing and split and abnormally enlarged sprocket-hole indicating structure, a normally active and stationary slidable latching mechanism interengaging with said structure for maintaining the latter depressed, said structure including a presser foot for depressing a portion of the film following the leading edge of the split of a split sprocket-hole, said element being secured to said mechanism and positioned in the path of the leading edge of the depressed portion of the film whereby said element will be slid from its normal position by the said depressed portion of the film and carry said mechanism therewith to an extent to release said structure to permit of the automatic elevating of the latter from its depressed position and thus indicate the detection of a split sprocket-hole.

5. In a detection device for the purpose set forth, a normally non-slidable resilient detector element arranged to be depressed by the travel thereover of a film provided with a row of non-split sprocket receiving holes normally of uniform size, a releasable normally depressed, latched, horizontally revoluble, automatically upwardly movable combined film holding down, film concealing and split and abnormally enlarged sprocket-hole indicating structure, a normally active and stationary slidable latching mechanism interengaging with said structure for maintaining the latter depressed, said element being secured to said mechanism and adapted to enter an abnormally enlarged sprocket-hole whereby said element will be slid from its normal position by the film carrying said mechanism therewith to an extent to release said structure to permit of the automatic elevating thereof from its depressed position and thus indicate the detection of an enlarged hole, the said latching mechanism being horizontally disposed, spring controlled, and formed with an opening for the passage therethrough of said element and provided with a manually releasable means therefor.

6. In a detection device for the purpose set forth, a normally non-slidable resilient detector element arranged to be depressed by the travel thereover of a film provided with a row of non-split sprocket receiving holes normally of uniform size, a releasable normally depressed, latched, horizontally revoluble, automatically upwardly movable combined film holding down, film concealing and split and abnormally enlarged sprocket-hole indicating structure, a normally active and stationary slidable latching mechanism interengaging with said structure for maintaining the latter depressed, said element being secured to said mechanism and adapted to enter an abnormally enlarged sprocket-hole whereby said element will be slid from its normal position by the film carrying said mechanism therewith to an extent to release said structure to permit of the automatic elevating of the latter from its depressed position and thus indicate the detection of an enlarged hole, said structure including a presser foot for depressing a portion of the film following the leading edge of the split of a split sprocket-hole, said element being positioned in the path of the leading edge of the depressed portion of the film whereby said element will be slid from its normal position by the depressed portion of the film and carry said mechanism therewith to an extent to release said structure to permit of the automatic elevating of the latter from its depressed position and thus indicate the detection of a split sprocket-hole, the said latching mechanism being horizontally disposed, spring controlled, and formed with an opening for the passage therethrough of said element and provided with a manually releasable means therefor.

7. In a detection device for the purpose set forth, a normally non-slidable resilient detector element arranged to be depressed by the travel thereover of a film provided with a row of non-split sprocket receiving holes normally of uniform size, a releasable normally depressed, latched, horizontally revoluble, automatically upwardly movable combined film holding down, film concealing and split and abnormally enlarged sprocket-hole indicating structure, a normally active and stationary slidable latching mechanism interengaging with said structure for maintaining the latter depressed, said structure including a presser foot for depressing a portion of the film following the leading edge of the split of a split sprocket-hole, said element being secured to said mechanism and extended in the path of the depressed portion of the film whereby said element will be slid from its normal position by the film carrying said mechanism therewith to an extent to release said structure to permit of the automatic elevating thereof from its depressed position and thus indicate the detection of a split sprocket-hole, the said latching mechanism being horizontally disposed, spring controlled, and formed with an opening for the passage therethrough of said element and provided with a manually releasable means therefor.

8. In a detection device for the purpose set forth, a normally non-slidable resilient detector element arranged to be depressed by the travel thereover of a film provided with a row of non-split sprocket receiving holes normally of uniform size, a releasable normally depressed, latched, horizontally revoluble, automatically upwardly movable combined film holding down, film concealing and split and abnormally enlarged sprocket-hole indicating structure, a normally active and stationary slidable latching mechanism interengaging with said structure for maintaining the latter depressed, said element being secured to said mechanism and adapted to enter an abnormally enlarged sprocket-hole whereby said element will be slid from its normal position by the film carrying said mechanism therewith to an extent to release said structure to permit of the automatic elevating thereof from its depressed position and thus indicate the detection of an enlarged hole, a standard formed with a socket and a slit, said structure being mounted in said socket, extending laterally from and through said slit formed in the standard, and arranged in the path of said mechanism and having means coacting with the lower end of the standard for limiting its vertical movement.

9. In a detection device for the purpose set forth, a normally non-slidable resilient detector element arranged to be depressed by the travel thereover of a film provided with a row of non-split sprocket receiving holes normally of uniform size, a releasable normally depressed, latched, horizontally revoluble, automatically upwardly movable combined film holding down, film concealing and split and abnormally enlarged sprocket-hole indicating structure, a normally active and stationary slidable latching mechanism interengaging with said structure for maintaining the latter depressed, said element being secured to said mechanism and adapted to enter an abnormally enlarged sprocket-hole whereby said element will be slid from its normal position by the film carrying said mechanism therewith to an extent to release said structure to permit of the automatic elevating thereof from its depressed position and thus indicate the detection of an enlarged hole, said structure including a presser foot for depressing a portion of the film following the leading edge of the split of a split sprocket-hole, said element being positioned extended in the path of the leading edge of the depressed portion of the film whereby said element will be slid from its normal position by the depressed portion of the film and carry said mechanism therewith to an extent to release said structure to permit of the automatic elevating of the latter from its depressed position and thus indicate the detection of a split sprocket-hole, a standard formed with a socket and a slit, said structure being mounted in said socket, extending laterally from and through said slit formed in the standard, and arranged in the path of said mechanism and having means coacting with the lower end of the standard for limiting its vertical movement.

10. In a detection device for the purpose set forth, a releasable, depressible, horizontally revoluble, automatically upwardly movable, combined film holding down, film concealing and split and abnormally enlarged sprocket-hole indicating structure comprising a spring actuated rotatable vertically movable shaft carrying an angle-shaped film holding down and concealing member and an angle-shaped presser foot for depressing a split portion of the concealed film, said foot being carried by and offset with respect to said member.

11. In a detection device for travelling film having a split part, a structure having means to provide a guide passage for the travel of the film, said passage having a bottom and a pair of side walls, said structure being formed with a slot having a pair of side walls disposed lengthwise of the bottom of said passage, said slot opening into said passage in proximity to one of the side walls of the latter, a normally active indicator latching mechanism including a releasing element therefor extending through said slot into said passage, and said structure being formed with a cavity in the bottom of said passage between a side wall of said slot and a side wall of said passage for receiving a depressed portion of the split part of the travelling film whereby said depressed portion will be arranged to shift said element during the travelling of the film for moving said latching mechanism to inactive position.

12. In a detection device for the purpose set forth, a horizontally disposed spring actuated slidable latching mechanism for a split and abnormally enlarged sprocket-hole indicating structure, said mechanism including a spring actuated horizontally slidable plate having means for engaging into said structure for latching the latter in depressed position, said plate being formed with an opening, and a resilient detecting element arranged to be depressed by the travel thereover of a film with a row of non-split sprocket receiving holes normally of uniform size, said element being connected at one end to said plate and having its other end extending through said opening to be engaged by the edge of a split or the edge part of an abnormally enlarged sprocket-hole whereby said element will be caused to travel with the film and carry said plate therewith to an extent to move said mechanism from latching engagement with said structure.

13. In a detection device for sprocket-holes of motion picture films, a releasable, depressible, automatically upwardly movable film holding down, film concealing and split and abnormally enlarged sprocket-hole indicating structure, a locking mechanism including a normally inactive film shiftable releasing element therefor, said structure including an angle-shaped member for holding down and concealing successively lengths of the film during the travel of the latter, and an angle-shaped presser foot for depressing a split portion of the film during the travel of the latter to engage and shift during the travel of the film, the said element to provide for the releasing of said structure, said presser foot being carried by and offset relative to one side of said member.

14. In a detection device for the purpose set forth, a releasable, depressible, automatically upwardly movable combined film holding down, film concealing and split and abnormally enlarged sprocket-hole indicating structure, a locking mechanism for the said structure including a normally inactive film shiftable releasing element therefor, said structure including a film holding down and concealing member for successive lengths of a film during the travel of the latter, and a presser foot for depressing a split portion of the film during the travel of the latter to engage and shift, during the travel of the film, said releasing element to provide for the release of said structure, said presser foot being carried by and offset relative to said member.

15. In a detection device for the purpose set forth, a releasable, depressible, automatically upwardly movable combined film holding down, film concealing and split and abnormally enlarged sprocket-hole indicating structure including an angle-shaped member for holding down and concealing successive lengths of a film during the travel of the latter, and an angle-shaped presser foot for depressing a split portion of the film, during the travel of the latter to engage and operate, during the travel of the film a releasing element of a locking mechanism for said structure, said presser foot being carried by and offset relative to one side of said member, said member and presser foot each being formed of a vertical and a horizontal leg, the legs of the presser foot opposing the outer side edges of the legs of said member, the horizontal leg of the presser foot being of less length than the horizontal leg of said member, the said horizontal legs being arranged at the lower ends of the vertical legs.

16. In a detector device for sprocket-holes of motion picture films comprising a detecting unit formed of a resilient arm anchored at one end thereof, and an upstanding inclined head carried by the other end of said arm, said head including sides and top edges, said head being formed at its top with a detector lug, said lug being positioned adjacent the side edges of the head and having an inclined top edge.

EDWARD J. O'NEILL.